United States Patent [19]

Wheland

[11] Patent Number: 4,535,136

[45] Date of Patent: Aug. 13, 1985

[54] FLUOROOLEFIN POLYMERIZATION PROCESS USING ACYL HYPOFLUORITE CATALYST

[75] Inventor: Robert C. Wheland, Wilmington, Del.

[73] Assignee: E. I. Du Pont De Nemours and Company, Wilmington, Del.

[21] Appl. No.: 603,289

[22] Filed: Apr. 23, 1984

[51] Int. Cl.$^3$ .................. C08F 2/00; C08F 214/18; C08F 4/32

[52] U.S. Cl. ................... 526/214; 526/231; 526/250

[58] Field of Search ............... 526/231, 214, 246, 250, 526/213

[56] References Cited

U.S. PATENT DOCUMENTS 2,559,630  7/1951  Bullitt .
3,415,865  12/1968  Prager et al. .
3,420,866  1/1969  Prager et al. .
3,442,927  5/1969  Thompson et al. .
3,684,786  8/1972  Chandrasekaran .

FOREIGN PATENT DOCUMENTS 0093404  4/1983  European Pat. Off. .

OTHER PUBLICATIONS

Porter et al., *J. Amer. Chem. Soc.* 79:5625–5627 (1957).
Cady et al., *J. Amer. Chem. Soc.* 75:2501 (1953).
Menefee et al., *J. Am. Chem. Soc.* 76:2020–2021 (1954).
Thompson et al., *J. Am. Chem. Soc.* 89:2263–2267 (1967).
Barton et al., *Chem. Comm.* 122–123 (1972).
Rozen et al., *Tetrahedron Letters No. 8*, 725–727 (1979).
Rozen et al., *J. Am. Chem. Soc.* 101:2782–2784 (1979).
Rozen et al., *J. Fluorine Chem.* 16:19–31 (1980).
Rozen et al., *J. Org. Chem.* 45:672–678 (1980).
Lerman et al., *J. Org. Chem.* 46:4629–4631 (1981), 48:724–727 (1983).

*Primary Examiner*—Joseph L. Schofer
*Assistant Examiner*—Peter F. Kulkosky

[57] ABSTRACT

A process for the polymerization of fluorinated olefin monomers using a fluoroxy compound solution as initiator, wherein said solution has a fluoroxy compound concentration of at least 0.5 meq/liter. The concentration contains, based on the total number of fluoroxy compounds present, about 35 to 100% of an acyl hypofluorite of the formula $X(CF_2)_nCOOF$ wherein X is H or F and n is 1 to 16.

16 Claims, No Drawings

FLUOROOLEFIN POLYMERIZATION PROCESS USING ACYL HYPOFLUORITE CATALYST

BACKGROUND OF THE INVENTION

The present invention provides a process for the polymerization of fluorinated olefin monomers using fluoroxy compound solutions as initiators.

The fluoroxy compound solutions used in the present process are claimed and described in the commonly-assigned, copending application entitled "Fluoroxy Compound Solutions", in the names of Shlomo Rozen and William Joseph Middleton, Ser. No. 601,589 filed 4-18-84.

U.S. Pat. No. 2,559,630 (Bullitt) discloses the polymerization of fluoroolefins, including tetrafluoroethylene (TFE), initiated by a fluorinated acyl peroxide of the formula

wherein X is H or F and n is at least 2.

E.P.O. App. No. 0,093,404 (Daikin) discloses the copolymerization of TFE with fluoroalkylvinyl ethers in liquid medium, initiated by a fluorinated acyl peroxide of the formula

wherein n is 1 to 10.

Porter et al., J. Am. Chem. Soc. 79, 5625 (1957) disclose the use of trifluoromethyl hypofluorite, $CF_3OF$, to initiate gas-phase polymerization of TFE at room temperature.

Acyl hypofluorites of less than five carbon atoms have previously been reported. Cady et al., J. Am. Chem. Soc., 75, 2501 (1953), disclose the preparation of trifluoroacetyl hypofluorite ($CF_3CO_2F$) in low yield by fluorination of trifluoroacetic acid. Menefee et al., J. Am. Chem. Soc., 76, 2020 to 2021 (1954), disclose the preparation of pentafluoropropionyl hypofluorite, $C_2F_5CO_2F$, and heptafluorobutyryl hypofluorite by reaction of fluorine with the corresponding acids. The authors report that by placing about 2 ml of water in the reaction vessel and removing a trap, the yield of explosive product was greatly increased.

Thompson et al., J. Am. Chem. Soc., 89, 2263 to 2267 (1967), disclose the preparation of 1,1-bis(fluoroxy)perfluoropropane and 2,2-bis(fluoroxy)perfluoropropane by direct fluorination of the monosodium salt of perfluoroacetone hydrate. $(CF_3)_2C(OH)ONa$. The authors state that, in contrast, direct fluorination of perfluoroacetone hydrate yields $(CF_3)_2CFOF$ and that, in regard to the fluorination of trifluoroacetic acid and its salts, the acid affords rather low yields of the hypofluorite, $CF_3C(O)OF$ whereas the salts give yields of up to 60% $CF_3CF(OF)_2$.

U.S. Pat. No. 3,415,865 ('865 patent), issued to Prager et al. on Dec. 10, 1968, discloses perfluoroalkyl polyfluoroxy compounds having the formula $R_f(OF)_n$ wherein $R_f$ is a perfluorinated alkyl radical having from 1 to 18 carbon atoms and n is an integer from 2 to 12. The disclosed compounds are stated to be useful fluorinated oxidizing agents and are prepared by direct fluorination of compounds having a molecular structure in which at least one oxygen atom is directly linked to a carbon atom. Salts of carboxylic acids are included among the starting materials and may give mixtures of monooxyfluoro- and dioxyfluoro-substituted compounds. Alkali metal salts are disclosed as suitable. The use of an inert gaseous diluent, such as $N_2$, for fluorine is also disclosed and examples of fluorination of the sodium salts of perfluorohexanoic and perfluorodecanoic acids are given.

U.S. Pat. No. 3,420,866, issued to Prager et al. on Jan. 7, 1969, discloses the same compounds and process as the '865 patent. U.S. Pat. No. 3,442,927, issued to Thompson et al. on May 6, 1969, discloses fluoroxy compounds having the formula $(R)_nC(F)_mOF$ wherein R is a perfluorinated alkyl radical having 1 to 18 carbon atoms, n is an integer from 1 to 3, and m equals 3n.

Barton et al., Chem. Comm. 122 to 123 (1972), discuss the behavior of several different types of fluoroxy compounds as electrophilic fluorinating agents, and state that there is some suggestion that tertiary fluoroxy compounds might be disposed to free radical reactions.

Rozen et al., Tetrahedron Lett., 725 to 728 (1979), report that an oxidative solution results when elemental fluorine is passed into a suspension of $CF_3COONa$ in "freon" at $-75°$ C., and that up to 50% of the oxidizing ability of the solution is due to the presence of $CF_3CF_2OF$, although all of the oxidizing compounds present are presumably of the perfluoroxyfluoride type. The authors disclose the use of this solution to effect electrophilic fluorination.

Rozen et al., J. Am. Chem. Soc., 101, 2782 to 2783 (1979), report on the fluoroxy solution mentioned in the previous paragraph and disclose that use of excess fluorine leads to bis-fluoroxy compounds. The authors state that, if $CF_3COONa$ is not completely dried, the $F^-$ is immediately almost completely hydrated and $CF_3COOF$ is the main reaction product. Use of $CF_3COOF$ as an agent to form fluorohydrins is also disclosed.

Rozen et al., J. Fluorine Chem. 16, 19 to 31 (1980), disclose the use of solutions prepared by reacting $F_2$ with $CF_3COONa$ in absence of $H_2O$ as fluorinating agents to convert enol acetates to the corresponding $\alpha$-fluoroketones. Rozen et al., J. Org. Chem., 45, 672 to 678 (1980), disclose the reaction of sodium trifluoroacetate with fluorine in the presence of traces of water or HF to give mainly trifluoroacetyl hypofluorite, $CF_3COOF$ and the reaction of this in situ preparation with stilbenes and diphenylacetylene.

Lerman et al., J. Org. Chem., 46, 4629 to 4631 (1981), disclose the use of $CH_3COOF$ as an electrophilic fluorination agent for activated aromatic rings. Lerman et al., J. Org. Chem., 48, 724 to 727 (1983), disclose the use of $CH_3COOF$ as a fluorinating agent for 1,3-dicarbonyl derivatives.

The common initiators used for the polymerization of fluorinated olefins, such as persulfate and perfluoropropionyl peroxide, create processing problems. For example, persulfate gives products with reactive unstable end groups as evidenced by heavy discoloration of the resulting polymer during melt processing. Hydrolytic instability makes perfluoropropionyl peroxide initiation very inefficient in aqueous systems. The process of the present invention uses fluoroxy compound solutions as initiators for the polymerization of fluorinated olefins and avoids these problems, and in contrast yields polymers with few or no reactive end groups as evidenced by negligible discoloration during processing.

SUMMARY OF THE INVENTION

The present invention provides a process for polymerizing one or more olefinic monomers, at least one of which is fluorinated, comprising contacting said monomers with a fluoroxy compound solution of at least one fluoroxy compound, said solution having a fluoroxy compound concentration of at least 0.5 meq/liter; said concentration containing, based on the total number of equivalents of fluoroxy compounds present, about 35 to 100% of an acyl hypofluorite fluoroxy compound of the formula $X(CF_2)_nCOOF$, wherein X is H or F and n is 1 to 16, provided that X is F when n is 4 or less.

DETAILED DESCRIPTION OF THE INVENTION

The starting olefin monomers used in the present polymerization process include those of the formula $CX_2=CYZ$, wherein X, independently, is H or F; Y is H, F or Cl; and Z is H, F, Cl, R, or OR where R is $C_{1-4}$ perfluoroalkyl. Preferred monomers or monomer combinations for copolymerization are tetrafluoroethylene, tetrafluoroethylene/hexafluoropropylene, tetrafluoroethylene/ethylene, tetrafluoroethylene/perfluoro(methylvinyl)ether, tetrafluoroethylene/perfluoro(propylvinyl)ether.

The concentration of fluoroxy compounds present in the solutions used as initiators in the process of the present invention is determined by measuring the oxidative power of the fluoroxy solution.

The concentration of fluoroxy compounds present in the solutions used as initiators in the present process is at least 0.5 meq/liter, preferably at least 2 meq/liter. More preferably, the fluoroxy compound concentration is at least 2 to about 60 meq/liter, most preferably at least 2 to about 50 meq/liter. Solutions having a fluoroxy compound solution of more than about 60 meq/liter are difficult and time-consuming to prepare. Moreover, the possibility of explosive decomposition becomes significant above 60 meq/liter, and protective safeguards such as barricades and/or special reactors capable of withstanding explosion become necessary. The concentration of fluoroxy compounds present in the solution (meq/liter), can be determined by the titration procedure described in Example 1 for determining oxidant concentration.

The concentration of fluoroxy compounds in the solutions used in the present process contains about 35 to 100% acyl hypofluorite, based on the total number of equivalents of fluoroxy compounds present. Preferably, the fluoroxy compound concentration contains about 70 to 100% acyl hypofluorite, because these solutions provide greater selectivity and higher yields of products in polymerization reactions.

The acyl hypofluorite present in the fluoroxy solution used as an initiator in the present process has the formula $X(CF_2)_nCOOF$ wherein X is H or F and n is 1 to 16, preferably 5 to 16, more preferably 6 to 12.

The preferred fluoroxy solutions are stable during long term storage at about $-20°$ to $0°$ C., in containers constructed of inert materials such as "Pyrex" glass or selected synthetic polymers such as polytetrafluoroethylene, without appreciable loss of their activity. Moreover, the acyl hypofluorites of these fluoroxy solutions are nonvolatile, and the oxidative power of the solutions can easily be measured and the solutions are easily handled. The fluoroxy solutions containing acyl hypofluorite of the formula $X(CF_2)_nCOOF$, wherein n is less than 5, are less stable than the preferred fluoroxy solutions, but, when freshly prepared, these solutions are useful for initiating polymerization and their oxidative power can be measured.

The fluoroxy solution is prepared by contacting a suspension of a salt of the formula $X(CF_2)_nCOOM$, wherein X and n are as previously defined and M is Li, Na, K or Cs, with excess elemental fluorine in a liquid, inert fluorocarbon medium. Preferably, M is K or Cs. Preferably, the suspension of salt to be contacted with fluorine contains water, preferably about 0.2 to 2 moles of water per mole of anhydrous salt. Most preferably, water is provided by using a hydrated salt prepared by recrystallization from water.

An inert, liquid fluorocarbon medium is used to suspend the salt and to dissolve the final product mixture of the fluoroxy solution. Suitable liquids include perfluorinated hydrocarbons, such as perfluorooctanes, perfluorohexanes, perfluorocyclohexane, and the like; and perfluorocyclic ethers, such as perfluoro-2-butyltetrahydrofuran.

The fluoroxy solution used as an initiator in the present process is prepared by contacting elemental fluorine with the aforesaid suspension of fluoroxyacid salt. The fluorine is diluted with nitrogen or other inert gas and is used in a concentration of about 0.5 to 5% by volume based on the total volume of inert gas and fluorine. A concentration of about 1% by volume of fluorine in inert gas is preferred. Preferably, during preparation of the solution, a temperature of about $-78°$ to $-20°$ C., most preferably about $-50°$ to $-20°$ C., is maintained.

The exact composition of the fluoroxy solution used as an initiator in the present process is not known but $^{19}$F-NMR spectroscopic data indicate that it is comprised of a mixture of acyl hypofluorite (1), hypofluorite (2), and bishypofluorite (3)

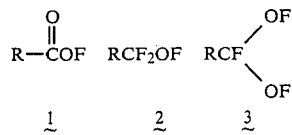

wherein R is $X(CF_2)_n$ and X and n are as previously defined.

The number of equivalents of the acyl hypofluorite (1) contained in the fluoroxy compound concentration of in the fluoroxy solution is dependent on the hydration state of the starting salt. Salts having one or more mole equivalent of water of hydration generally give solutions with a fluoroxy compound concentration containing about 35 to 100% acyl hypofluorite, based on the total number of equivalents of fluoroxy compounds present. Aqueous-recrystallized, hydrated salts give solutions with a fluoroxy compound concentration containing about 50 to 100% acyl hypofluorite. The number of equivalents of acyl hypofluorite present can be determined by addition of the solution to stilbene and gas chromatographic analysis of the resulting fluoroalkanoyloxystilbene adduct.

The polymerization process of the present invention is conducted at a temperature of about $0°$ to $100°$ C. and at a pressure of about 101 kPA (atmospheric) to 10.3 MPa (1500 psi). Polymerization according to the present invention is effected in the presence of a suitable reaction medium such as an inert, liquid fluorocarbon medium as previously described, water or other media which do not themselves react with the fluoroxy solutions.

GENERAL PROCEDURE FOR NONAQUEOUS CONDITIONS

A pressure vessel is loaded with a solvent suitable for running polymerizations. Preferred solvents are perfluorinated hydrocarbons such as perfluorooctane, perfluorocyclohexane, and the like; perfluoro ethers such as perfluoro-2-butyltetrahydrofuran; fluorinated tertiary amines such as tris-perfluoro-n-butylamine; and halofluorocarbons such as 1,1,2-trichloro-1,2,2-trifluoroethane. The system is pressured to about 101 kPa (atmospheric) to 10.3 MPa (1500 psi) with one or more monomers and maintained from about 0° to 100° C. Hypofluorite initiator dissolved in a suitable solvent, such as one of the preferred solvents given above, is then introduced. Additional monomers of the same or different structure can be added as the polymerization proceeds. After polymerization, the polymer is then separated, washed if desired, and dried.

GENERAL PROCEDURE FOR AQUEOUS CONDITIONS

A pressure vessel is loaded with water. The further addition of a fluorosurfactant is preferred but not necessary. Preferred fluorosurfactants are

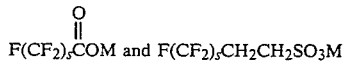

wherein s is 3 to 10; M is an alkali metal, H, or $H_4N^+$. The system is deoxygenated by flushing with an inert gas such as nitrogen or argon, by evacuation, or by a combination of both. One or more monomers are introduced at about 101 kPa (atmospheric) to 10.3 MPa (1500 psi). The resulting reaction mixture is maintained at about 0° to 100° C. Hypofluorite initiator dissolved in a suitable solvent is introduced. Preferred solvents are those listed earlier for nonaqueous conditions. As polymerization proceeds, additional monomers of the same or different structure can be added. After polymerization any emulsion formed is broken and the polymer is then separated, washed if desired, and dried.

The invention is illustrated by the following examples in which all temperatures are in degrees Celsius and all percentages are by weight unless otherwise stated. In the examples, the vibrating mixer was equipped with a hollow shaft for liquid or gas delivery and gas chromatographic analysis was conducted with a Supelco Co. 6'×⅛" stainless column packed with 20% FS-1265 on 60/80 Gas Chrome-R.

EXAMPLE 1

Polymerization of Tetrafluoroethylene

Hydrated potassium perfluorooctanoate (1.5 mol of $H_2O$/mol of salt, 6.36 g) was suspended in 450 mL of perfluoro-2-butyltetrahydrofuran and the resulting mixture was cooled to $-78°$ under nitrogen. The mixture was agitated with a vibrating mixer while fluorine (1% by volume in nitrogen, approximately 40 mmole) was bubbled into the mixture for 24 hours. A 10 mL aliquot of the resulting solution was treated with excess acidified aqueous potassium iodide and titrated with 0.01M sodium thiosulfate. The titration indicated that the concentration of oxidant (fluoroxy compounds) in the solution was 6.0 meq/liter. The fluoroxy solution was filtered through glass wool and then stored at 0°.

Then, a 500 mL polymer kettle was loaded with 200 mL of water and 1 g of perfluorooctanoic acid as a surfactant. For three times, the kettle was pressurized to 620 kPa (90 psi) with argon, the kettle's contents were stirred for 1 minute, and then the pressure in the kettle was reduced to 13.3 kPa (100 mm) by evacuation. A 1-liter cylinder containing 33 g of tetrafluoroethylene was attached to the kettle so as to permit introduction of tetrafluoroethylene as desired. Pressure in the kettle was brought to 101.4 kPa (14.7 psi) by addition of tetrafluoroethylene from the cylinder, and then 15 mL of the prepared fluoroxy solution (as initiator) were injected with stirring. The cylinder was opened to add more tetrafluoroethylene and to bring the pressure in the kettle to 483 kPa (70 psi). After 86 minutes, the pressure in the system dropped below 101 kPa (14.7 psi). The resulting polymer was filtered, washed with a methanol-water solution containing equal volume of each, and dried to give 28 g (85% yield) of white poly(tetrafluoroethylene). This polymer was molded to a white plug at 372°. Thus, the polymer was obtained in a high yield with good thermal stability.

EXAMPLE 2

Polymerization of Tetrafluoroethylene

Potassium perfluorooctanoate (6 g) was stored in a desiccator over water for 3 days. After this period, the increased weight of the salt indicated the formation of the 1.0–1.5 hydrate. The hydrated salt was fluorinated in perfluoro-2-butyltetrahydrofuran with 1% fluorine in nitrogen until 2.5 to 3 mmoles of oxidizing fluoroxy solution were formed.

Then, using a procedure similar to that described in Example 1, tetrafluoroethylene was polymerized using the prepared fluoroxy solution as a free-radical initiator. When the tetrafluoroethylene cylinder was fully opened to the kettle, pressure in the kettle was brought to 463 kPa (67 psi). After 99 minutes, pressure in the system dropped to 62 kPa (9 psi). The resulting solution was filtered, washed with a methanol-water solution containing equal volumes of each (1:1 methanol:water) and dried to give 25.8 g (78% yield) of white poly(tetrafluoroethylene). This polymer was molded to an off-white plug at 372°.

EXAMPLE 3

Polymerization of Tetrafluoroethylene

Hydrated potassium perfluorooctanoate (recrystallized from $H_2O$, 8.69 g) was suspended in 450 mL of perfluoro-2-butyltetrahydrofuran and the resulting mixture was cooled to $-78°$ under nitrogen. The mixture was agitated with a vibrating mixer while fluorine (1% volume in nitrogen, approximately 40 mmole) was bubbled into the mixture for 24 hours. A 10 mL aliquot of the resulting solution was treated with excess acidified aqeuous potassium iodide and titrated with 0.01M sodium thiosulfate. The titration indicated that the concentration of oxidant in the fluoroxy solution was 4.5 meq/liter. The solution was filtered through glass wool and then stored at 0°. The acyl hypofluorite contained in the fluoroxy solution was 79% of the total fluoroxy compounds present, and was determined by adding stilbene to the solution and measuring the amount of fluoro-perfluoroalkanoyloxy stilbene adduct produced.

Then, tetrafluoroethylene was polymerized using a procedure similar to that described in Example 1 and 15 mL of the prepared oxidizing fluoroxy solution as initiator. When the tetrafluoroethylene cylinder was opened fully, the system was brought to 483 kPa (70 psi). Once tetrafluoroethylene stopped being absorbed, the system was evacuated and a new cylinder containing 33 g of tetrafluoroethylene attached. After the fifth such cylinder was added, the resulting mixture was filtered, the product washed with 1:1 methanol:water and dried to give 147 g (89% yield) of white poly(tetrafluoroethylene). This polymer molded to a white plug at 372°.

This example demonstrates that a high yield of polymer is obtained when an initiator solution high in acyl hypofluorite (prepared from hydrated salts) is utilized.

COMPARATIVE EXAMPLE A

Tetrafluoroethylene was polymerized using a procedure similar to that described in Example 1 but using as an initiator a fluoroxy solution prepared from anhydrous potassium perfluorooctanoate. The perfluorooctanoyl hypofluorite contained in the fluoroxy solution was 15% of the total fluoroxy compounds present. When the tetrafluoroethylene cylinder was opened fully to the kettle, the system was brought to 470 kPa (68 psi). After 64 minutes, pressure had decreased only to 370 kPa (54 psi) and tetrafluoroethylene absorption had stopped. Freezing the solution to help break any emulsion formed, allowing the resulting frozen solution to melt, filtering, washing with 1:1 methanol:water, and drying gave 6 g (18%) of white poly(tetrafluoroethylene). This polymer was molded to a gray plug at 372°.

This example demonstrates that although polymer is formed when an anhydrous salt is used as precursor to the initiator, the yield is low compared to when the hydrated salt is used. The thermal stability of the polymer is also reduced.

EXAMPLE 4

Polymerization of Tetrafluoroethylene-Low Temperature

Hydrated potassium perfluorooctanoate (1.0 mol of $H_2O$/mol of salt, 8.15 g) was suspended in 450 mL of perfluoro-2-butyltetrahydrofuran and the resulting mixture was cooled to $-78°$ under nitrogen. The mixture was agitated with a vibrating mixer while fluorine (1% by volume in nitrogen, approximately 40 mmole) was bubbled into the mixture for 24 hours. A 10 mL aliquot of the resulting solution was treated with excess acidified aqueous potassium iodide and titrated with 0.01M sodium thiosulfate. The titration indicated that the concentration of oxidant in the solution was 3.3 meq/liter. The fluoroxy solution was filtered through glass wool and then stored at 0°.

Then, tetrafluoroethylene was polymerized using a procedure similar to that described in Example 1 and the prepared fluoroxy solution as initiator. However, the kettle was cooled to 2.2° in an ice bath and then 15 mL of the fluoroxy solution were injected with stirring. The tetrafluoroethylene cylinder was then fully open to the kettle, raising the pressure of the system to 460 kPA (67 psi). After 2 minutes, the pressure dropped to 434 kPa (63 psi) with an increase in temperature to 4.2°. After 128 minutes the pressure in the system had dropped to 200 kPa (29 psi) and the temperature had increased to 27°. A suspension and emulsion of white polymer were obtained.

COMPARATIVE EXAMPLE B

Polymerization of Tetrafluoroethylene-Peroxide Initiator

A 500 mL polymer kettle was loaded with 200 mL of water, 1 g of perfluorooctanoic acid as surfactant and 0.1 g of potassium hydroxide. For three times, the kettle was pressurized with argon to 620 kPa (90 psi), the contents of the kettle were stirred for 1 minute, and then pressure in the kettle was reduced to 13.3 kPa (100 mm) by evacuation. A 1-liter cylinder containing 33 g of tetrafluoroethylene was connected to the kettle and then opened fully to bring the pressure in the kettle to 460 kPa (67 psi). Temperature within the kettle was raised to 50° by heating and then 0.81 mL of 0.12M perfluoropropionylperoxide in 1,1,2-trifluorotrichloroethane (0.1 mmol total initiator) was injected over a 3-hour period. The resulting product mixture was filtered, washed with water and methanol, and dried to give 9 g (27% yield) of white poly(tetrafluoroethylene). When molded at 372° this polymer resulted in a gray plug.

COMPARATIVE EXAMPLE C

Polymerization of Tetrafluoroethylene-Persulfate Initiator

To a 500 mL kettle were added 200 mL of water, 1 g of perfluorooctanoic acid as a surfactant, 1 g of potassium persulfate, and 0.15 g of potassium hydroxide. Twice, the kettle was pressurized to 620 kPa (90 psi) with argon, its contents were stirred for 1 minute, and then the pressure in the kettle was reduced to 13.3 kPA (100 mm) by evacuation. A 1-liter cylinder containing 33 g of tetrafluoroethylene was connected to the vessel and then opened fully, raising the pressure in the kettle to 500 kPa (73 psi). The resulting reaction mixture was heated at 90° for 1 hour, then washed with methanol and water, and dried to give 21 g (64% yield) of white poly(tetrafluoroethylene). When molded at 372°, this polymer gave a partially black plug.

EXAMPLE 5

Copolymerization of Tetrafluoroethylene with Ethylene

Hydrated potassium perfluorooctanoate (recrystallized from $H_2O$, 10.2 g) was suspended in 450 mL of 1,1,2-trifluorotrichloroethane and the resulting mixture was cooled to $-25°$ under nitrogen. The mixture was agitated with a vibrating mixer while fluorine (1% by volume in nitrogen, approximately 40 mmole) was bubbled into the mixture for 24 hours. A 10 mL aliquot of the resulting solution was treated with excess solidified aqueous potassium iodide and titrated with 0.01M sodium thiosulfate. The titration indicated that the concentration of oxidant in the solution was 3.3 meq/liter. The solution was filtered through glass wool and then stored at 0°. The acyl hypofluorite contained in the fluoroxy solution was 77% of the total fluoroxy compounds present, and was determined by adding stilbene to the solution and measuring the amount of fluoro-perfluoroalkanoyloxy stilbene adduct produced.

Then, a 400 mL shaker tube was purged with $N_2$ and loaded with 200 mL of deoxygenated 1,1,2-trifluorotrichloroethane, 10 mL of water and 15 mL of the prepared fluoroxy solution. The tube was cooled to about $-40°$, the pressure in it was reduced by evacuation, and then 50 g of tetrafluoroethylene and 14 g of ethylene were added. The contents of the tube were shaken for 2 hours at ambient temperature (about 25°), and for 2 hours at 50°. The resulting product was filtered, washed with 1,1,2-trifluorotrichloroethane, washed with 1:1 methanol:water, and dried to give 36 g of ethylene/tetrafluoroethylene copolymer. The polymer was white after it was extruded at 297°.

COMPARATIVE EXAMPLE D

Copolymerization of Tetrafluoroethylene with Ethylene—Persulfate Initiator

A 400 mL shaker tube was charged with 10 mL of water, 0.25 g of ammonium perfluorooctanoate as a surfactant, 0.1 g of ammonium persulfate, and 200 mL of 1,1,2-trifluorotrichloroethane. The tube was cooled to about −40°, the pressure in the tube was reduced by evacuation, and then 50 g of tetrafluoroethylene and 14 g of ethylene were added. The contents of the tube were shaken for 2 hours at 90°. The resulting product mixture was filtered and the product was washed with 1:1 methanol:water and dried to give 11 g of polymer. The polymer turned brown when molded at 297°.

EXAMPLE 6

Copolymerization of Tetrafluoroethylene with Hexafluoropropylene

Hydrated potassium perfluorooctanoate (recrystallized from $H_2O$, 60 g) was suspended in 450 mL of perfluoro-2-butyltetrahydrofuran and the resulting mixture was cooled to −20° under nitrogen. The mixture was agitated with a vibrating mixer while fluorine (1% by volume in nitrogen, approximately 40 mmole) was bubbled into the mixture for 24 hours. A 10 mL aliquot of the resulting solution was treated with excess acidified aqueous potassium iodide and titrated with 0.01M sodium thiosulfate. The titration indicated that the concentration of oxidant in the solution was 34.1 meq/liter. The fluoroxy solution was filtered through glass wool and then stored at 0°. The acyl hypofluorite contained in the fluoroxy compound concentration of the fluoroxy solution was 79% of the total fluoroxy compounds present, and was determined by adding stilbene to the solution and measuring the amount of fluoro-perfluoroalkanoyloxy stilbene adduct produced.

Then, to a 400 mL shaker tube which was purged with $N_2$, were added 200 mL of water and 1 g of perfluorooctanoic acid as a surfactant. The contents of the tube were frozen and 5 mL of the prepared fluoroxy solution initiator were added. The tube was cooled to about −40°, the pressure in the tube was reduced by evacuation, and then 25 g of tetrafluoroethylene (TFE) and 75 g of hexafluoropropylene (HFP) were added. The contents of the tube were then shaken for 2 hours at 50°. The resulting product mixture was filtered, washed with 1:1 methanol:water, and dried to yield 19.6 g of a white copolymer which by infrared spectroscopic analysis was determined to contain 93.1% TFE and 6.9% HFP.

EXAMPLE 7

Copolymerization of Tetrafluoroethylene with Perfluoropropylvinyl Ether in Perfluorobutyltetrahydrofuran Hydrated potassium perfluorooctanoate (recrystallized from $H_2O$, 31.52 g) was suspended in 450 mL of perfluoro-2-butyltetrahydrofuran and the resulting mixture was cooled to −78° under nitrogen. The mixture was agitated with a vibrating mixer while fluorine (1% by volume in nitrogen, approximately 40 mmole) was bubbled into the mixture for 24 hours. A 10 mL aliquot of the resulting solution was treated with excess acidified aqueous potassium iodide and titrated with 0.01M sodium thiosulfate. The titration indicated that the concentration of oxidant in the solution was 41.9 meq/liter. The fluoroxy solution was filtered through glass wool and then stored at 0°.

Then, a 500 mL polymer kettle was loaded with 200 mL of perfluoro-2-butyltetrahydrofuran and sealed. Thrice, the kettle was pressurized to 620 kPa (90 psi) with argon, the contents of the kettle were stirred for 1 minute, and then pressure in the kettle was reduced to 13.3 kPA (100 mm) by evacuation. A 1-liter cylinder containing 33 g of tetrafluoroethylene was attached to the kettle so as to permit introduction of tetrafluoroethylene as desired. Pressure in the kettle was brought to 101.4 kPa (14.7 psi) by addition of tetrafluoroethylene from the cylinder. Next, 1 mL of perfluoropropylvinyl ether and then 5 mL of the prepared fluoroxy solution (as initiator) were injected into the kettle. When the tetrafluoroethylene cylinder was fully opened to the kettle, pressure in the kettle was brought to 303 kPa (44 psi). After 92 minutes, pressure in the system had dropped to 69 kPa (10 psi). The resulting product was filtered, washed with $CCl_2FCF_2Cl$, and dried to give 31.13 g of solid white polymer. When extruded at 372°, the polymer gave a white, translucent product.

EXAMPLE 8

Copolymerization of Tetrafluoroethylene with Perfluoropropylvinyl Ether in Water Using a procedure similar to that described in Example 1, polymerization was conducted with a fluoroxy solution prepared according to Example 7 as a free-radical initiator. First, 1 mL of perfluoropropylvinyl ether and then 5 mL of initiator solution were injected. When the tetrafluoroethylene cylinder was opened fully to the kettle, pressure in the kettle was brought to 483 kPa (70 psi). After 257 minutes, pressure in the system had dropped to 193 kPa (28 psi). The resulting polymer mixture was frozen, thawed, filtered, washed with 1:1 methanol:water and dried to give 17.02 g of white polymer. The polymer extruded with bubbling at 372° and gave a gray product.

COMPARATIVE EXAMPLE E

Copolymerization of Tetrafluoroethylene with Perfluoropropylvinyl Ether in Water Comparison of Potassium Persulfate Initiation For this example, a procedure similar to that described in comparative Example C was employed except that 1 g of ammonium perfluorooctanoate was used as surfactant and no potassium hydroxide was used. First, 1 mL of perfluoropropylvinyl ether was injected and then the tetrafluoroethylene cylinder was fully opened to the kettle, bringing the pressure within the kettle to 517 kPA (75 psi). The kettle was heated to 89° and after 103 minutes, pressure in the system had dropped to 137 kPa (20 psi). The resulting polymer was filtered, washed with 1:1 methanol:water, and dried to give 22.5 g of white solid product. When extruded at 372°, the polymer bubbled and became dark gray.

What is claimed is:

1. A process for polymerizing one or more olefin monomers, at least one of which is fluorinated, comprising contacting said monomers with a fluoroxy compound solution of at least one fluoroxy compound, said solution containing an acyl hypofluorite compound of the formula RCOOF and having a fluoroxy compound concentration of at least 0.5 meq/liter; said concentration containing, based on the total number of equivalents of fluoroxy compounds present, about 35 to 100% of RCOOF; other fluoroxy compounds in said solution having the formulae $RCF_2OF$ and $RCF(OF)_2$; wherein for each occurrence R is $X(CF_2)_n—$, n is 1 to 16, and X is H or F, provided that X is F when n is 4 or less.

2. A process according to claim 1 wherein the concentration is at least 2 meq/liter.

3. A process according to claim 2 wherein the concentration is at least 2 to about 60 meq/liter.

4. A process according to claim 3 wherein the concentration is at least 2 to about 50 meq/liter.

5. A process according to claim 4 wherein the contacting is carried out at a temperature of about 0° to 100° C.

6. A process according to claim 5 wherein the contacting is carried out at a pressure of about 101 kPa to 10.3 MPa.

7. A process according to claim 6 wherein the one or more monomers have the formula $CX_2=CYZ$, wherein X, independently, is H or F; Y is H, F or Cl; and Z is H, F, Cl, R or OR where R is $C_{1-4}$ perfluoroalkyl.

8. A process according to claim 7 wherein the monomer is tetrafluoroethylene.

9. A process according to claim 7 wherein the monomers are monomer combinations selected from tetrafluoroethylene/hexafluoroethylene, tetrafluoroethylene/ethylene, tetrafluoroethylene/perfluoro(methylvinyl)ether, and tetrafluoroethylene/perfluoro(propylvinyl) ether.

10. A process according to claim 6 wherein the contacting of the monomer(s) with the solution occurs in the presence of water.

11. A process according to claim 6 wherein the contacting of the monomer(s) with the solution occurs in the presence of an inert, liquid fluorocarbon medium.

12. A process according to claim 11 wherein the inert, liquid fluorocarbon medium is selected from the group consisting of perfluorinated hydrocarbons and perfluorocyclic ethers.

13. A process according to claim 6 wherein the fluoroxy compound concentration contains about 70 to 100% acyl hypofluorite.

14. A process according to claim 6 wherein n is 5 to 16.

15. A process according to claim 14 wherein n is 6 to 12.

16. A process according to claim 6 wherein the monomer is tetrafluoroethylene; the contacting of the monomer with the solution occurs in the presence of an inert, liquid fluorocarbon medium; the fluoroxy compound concentration contains about 70 to 100% acyl hypofluorite; and n is 6 to 12.

* * * * *